United States Patent [19]

Nofziger

[11] E Re. 29,290

[45] Reissued July 5, 1977

[54] PENDULUM AND ESCAPEMENT ANCHOR RELATIONSHIP INDICATOR AND SETTER

[75] Inventor: Dale Nofziger, Bothell, Wash.

[73] Assignee: Ansonia Clock Company, Inc., Lynnwood, Wash.

[22] Filed: July 30, 1975

[21] Appl. No.: 600,316

Related U.S. Patent Documents

Reissue of:

[64] Patent No.: 3,874,324
Issued: Apr. 1, 1975
Appl. No.: 439,877
Filed: Feb. 6, 1974

U.S. Applications:

[63] Continuation-in-part of Ser. No. 250,783, May 5, 1972, abandoned.

[52] U.S. Cl. ..... 116/124 R; 58/134

[51] Int. Cl.[2] ..... G04B 15/14; G04B 17/02

[58] Field of Search ..... 116/124 R; 58/132, 133, 58/134

[56] References Cited

UNITED STATES PATENTS

| | | | |
|---|---|---|---|
| 716,481 | 12/1902 | Rottler | 58/134 |
| 1,095,259 | 5/1914 | Wycoff | 58/134 |
| 1,423,410 | 7/1922 | Fawyer | 58/134 |
| 1,718,653 | 6/1929 | Lauffer | 58/134 |

*Primary Examiner*—S. Clement Swisher
*Assistant Examiner*—Denis E. Corr
*Attorney, Agent, or Firm*—Robert W. Beach

[57] ABSTRACT

As a guide for setting the relationship between the pendulum and escapement anchor of a clock, the pendulum can be aligned with a pendulum index. A crank stem has one end clamped to the anchor shaft and its other end is offset rearward for projection of its tip radially outward from the clock face for registration with an anchor index. The stem tip is accessible to serve as a handle for turning the anchor shaft relative to the pendulum arm to set the pendulum and anchor in the proper relationship to regulate the escapement for even operation.

9 Claims, 11 Drawing Figures

Fig. 8.
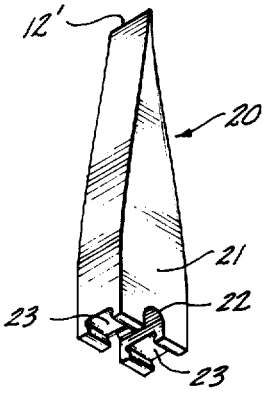
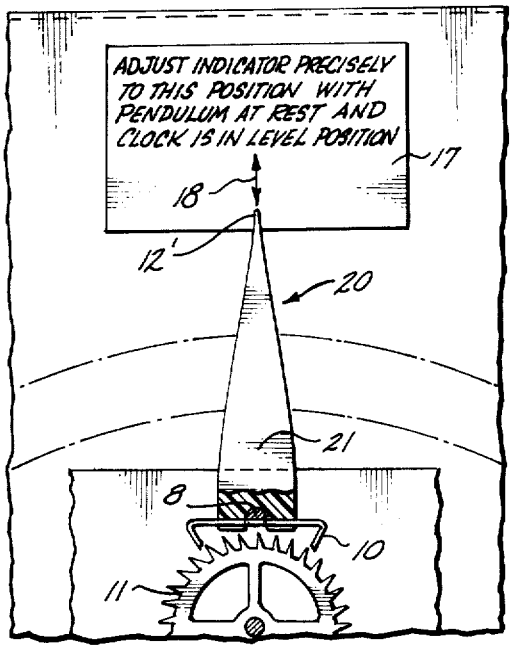
Fig. 6.
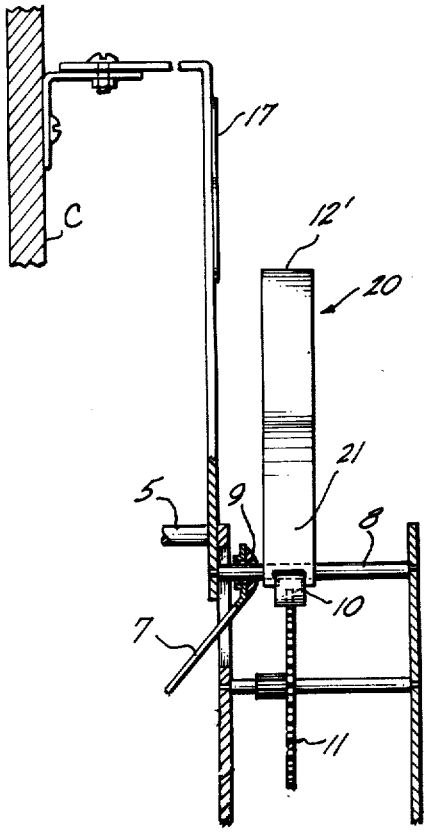
Fig. 7.
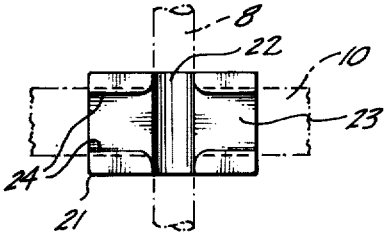
Fig. 9.
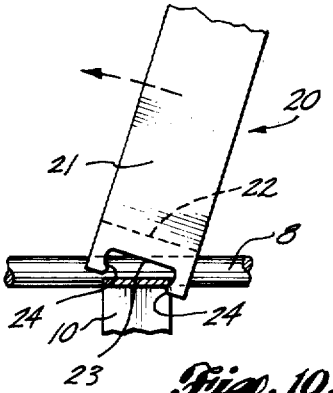
Fig. 10.
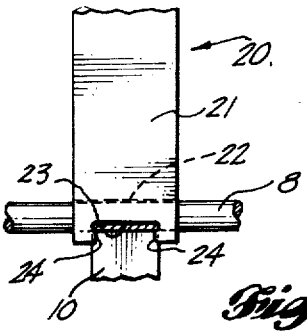
Fig. 11.

PENDULUM AND ESCAPEMENT ANCHOR RELATIONSHIP INDICATOR AND SETTER

Matter enclosed in heavy brackets [ ] appears in the original patent but forms no part of this reissue specification; matter printed in italics indicates the additions made by reissue.

This application is *for a reissue of U.S. Pat. No. 3,874,324 maturing from application Ser. No. 439,877 which was* a continuation-in-part of application Ser. No. 250,783, filed May 5, 1972, for Pendulum And Escapement Anchor Relationship Indicator And Setter, *now abandoned.*

The present invention provides both an indicator of the relationship between a pendulum and an escapement anchor of a clock and a setter to establish a desired relationship between the pendulum and the escapement anchor.

A principal object of the invention is to provide a setter to establish the relationship between the pendulum and escapement anchor of a clock which is readily accessible when the clock is in normal hung or standing position and which can be manipulated to establish such relationship without the use of tools.

A further object is to provide a combined indicator for indicating the relationship between a pendulum and an escapement anchor and a setter for altering such relationship, which is unobtrusive and which is concealed when the clock case is closed.

Another object is to provide such an indicator and setter which can be applied to clock mechanism easily and with minimum modification of the clock and which requires no modification of the clock mechanism.

It is also an object to provide an indicator and setter attachment which is inexpensive and which can be attached to and removed from clock mechanism quickly.

FIG. 6 is an enlarged fragmentary elevation showing an alternate type of indicator and setter applied to clock mechanism corresponding to FIG. 2, and FIG. 7 is a vertical section through a portion of the clock mechanism corresponding to FIG. 3 showing such alternate type of indicator and setter.

FIG. 8 is a bottom perspective of the alternate type of indicator and setter attachment, and FIG. 9 is a bottom plan of the lower end of such attachment. FIGS. 10 and 11 are fragmentary side elevations of the lower portion of the indicator and setter attachment illustrating the method of attaching the attachment to and detaching it from the clock mechanism.

Figure 1:
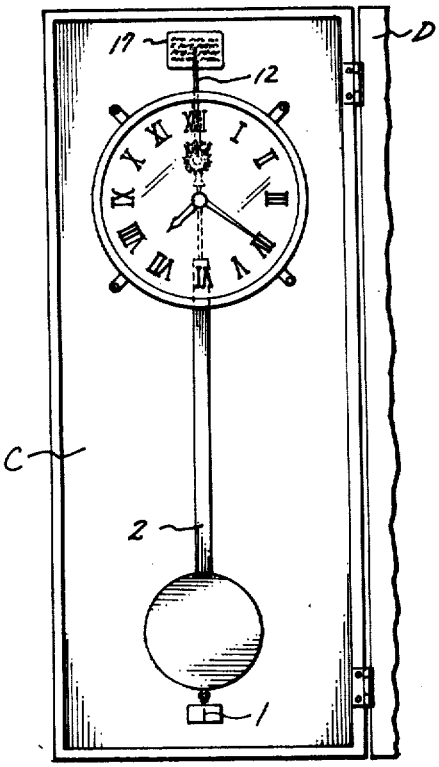
FIG. 1 is an elevation of clock mechanism to which the present invention has been applied.

The mechanism of clock C illustrated in FIG. 1 is representative, and it will be understood that the present invention could be applied to clocks having mechanism of different types. An important feature of the present invention is the provision of an index mark 1 with which the tip of the pendulum 2 will register when the clock is set plumb. Such placing of the clock is essential for its proper operation. The pendulum 2 is hung from a block 3 which is carried by flexure pivots 4 from the pendulum mount 5. The stem of the pendulum is engaged in a slot 6 of the pendulum arm 7 which is carried by the escapement anchor shaft 8.

In order to avoid the necessity of the clock parts being manufactured and assembled with great precision and further to compensate for any initial or subsequent bending or misalignment of the parts, it is customary for the pendulum arm to be mounted on the anchor shaft 8 by a friction collar connection 9. Such connection will have sufficient resistance to displacement so that the pendulum arm 7 and the anchor shaft 8 will normally function as an integral unit, but these parts can be shifted rotatively relative to each other to establish initially and to correct their operating relationship from time to time.

Figure 2:
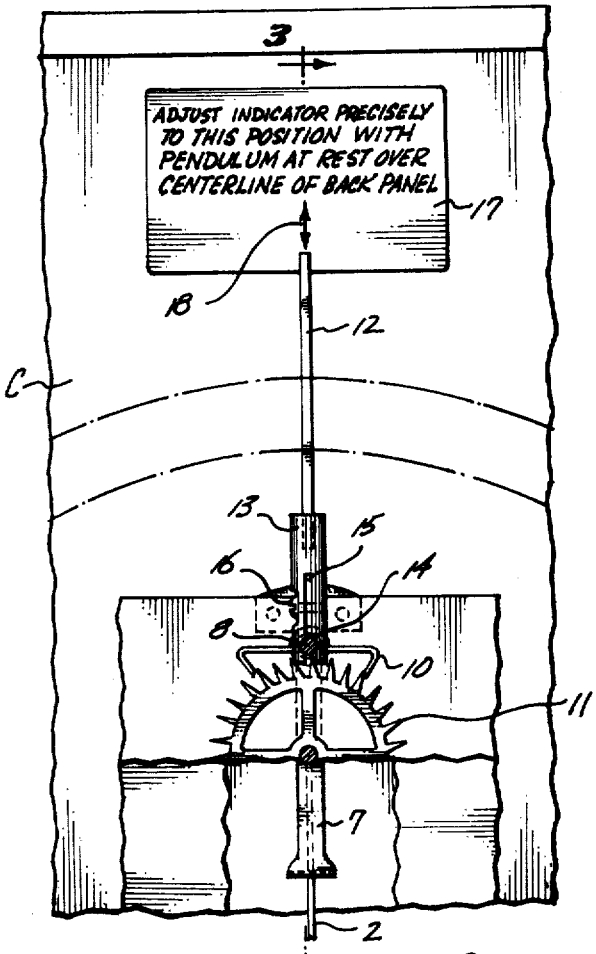
FIG. 2 is an enlarged fragmentary elevation taken on line 2—2 of FIG. 3, showing such mechanism.
Figure 3:
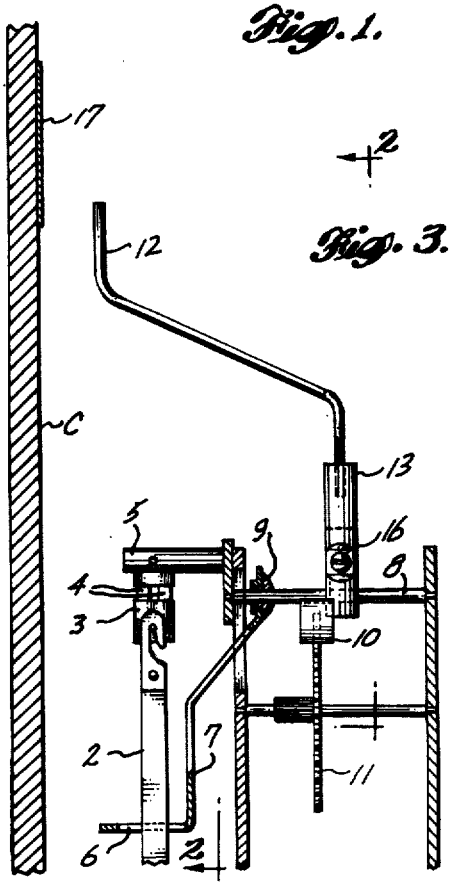
FIG. 3 is a vertical section through a portion of the clock mechanism taken on line 3—3 of FIG. 2.
Figure 4:
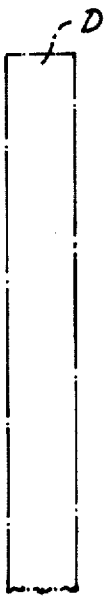
FIG. 4 is a top perspective of a portion of the clock mechanism with parts broken away.
Figure 4:
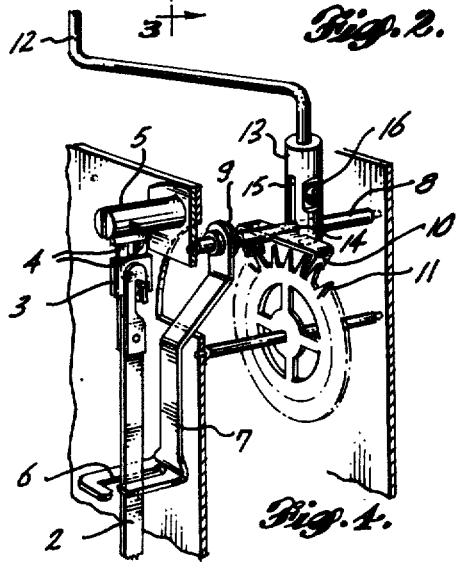

The particular escapement shown in FIGS. 2, 3 and 4 is of the deadbeat type, including the anchor 10 having pallets cooperating with the teeth of the escape wheel 11 in the usual way. To provide uniform ticking of the clock mechanism by regulation of the pendulum swinging, it is essential that the rotative relationship between the anchor shaft 8 and the pendulum connector arm 7 be established precisely. Normally such relationship would be effected by a clock technician turning such shaft relative to the arm 7 to establish the proper setting of the friction collar 9 on the shaft.

According to the present invention, such adjustment of the shaft 8 relative to the arm 7 can be effected easily and accurately by the clock owner without the use of tools and without providing access either to the pendulum connector arm 7 or to the anchor shaft 8. For this purpose the invention provides an attachment arm shown in FIGS. 2, 3 and 4 in the form of a crank stem having its outer end or tip portion 12 offset a substantial distance rearwardly from its inner end or base portion 13. Such inner end portion is enlarged and has a lengthwise slot 15 in which are provided shaft-gripping arcuate notches 14 in the outer slot end. Such slot provides sufficient flexibility so that the bifurcations formed by its open end can be spread so that, by movement of the attachment arm base portion 13 transversely of the length of shaft 8, the notches 14 will embrace the shaft snugly. The slotted crank base can be clamped on the shaft by a clamp bolt 16 extending across the slot 15 which can be contracted by tightening the clamp bolt. The clamped stem can thus be secured in cantilever fashion on the shaft 8.

The free tip end 12 of the crank stem is offset rearwardly from its end secured to the anchor shaft 8 so that such stem tip will be disposed adjacent to the rear wall of the case on which the clockworks are mounted. On this case rear wall is plate 17 bearing an anchor shaft index 18 with which the free tip of the crank stem should be aligned when the tip of the pendulum 2 is aligned with the pendulum index 1. When the stem and pendulum are in such aligned relationship with their respective indices, the pendulum arm 7 is in relationship to the escapement anchor 10 to provide even ticking of the clock, provided that the slotted crank end has been secured by the clamp bolt 16 in the proper relationship to the anchor shaft 8 to prevent swinging of the indicator arm relative to the anchor shaft.

Figure 5:
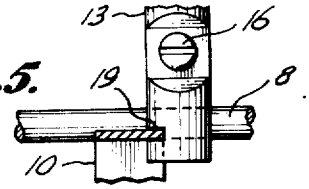
FIG. 5 is an enlarged detail side elevation of the connection between the attachment arm base and the anchor shaft.

In order to insure that the slotted crank end of the indicator and setter attachment is secured in proper relationship to the anchor shaft 8 and that applying a lateral force to the tip end of the attachment will not alter such relationship, the inner end portion of the attachment can have a laterally opening notch 19 shown best in FIG. 5 of a width to receive the edge of the anchor 10 at opposite sides of the anchor shaft 8. After the bifurcations of the attachment base portion 13 formed by slot 15 have been fitted over the anchor shaft 8 so that it is received in notches 14, the attachment can be shifted lengthwise of shaft 8 to engage notch 19 with the edge portion of the anchor, as shown in FIG. 5. Tightening of clamp bolt 16 will then secure the base 13 to the anchor shaft with notch 19 receiving the edge portion of the anchor.

It will be seen that the crank stem mounted on the anchor shaft 8 serves the dual function of an indicator and a setter. To utilize the invention the clock is set or hung so that the tip of the pendulum 2 is in precise alignment with the pendulum index mark 1 as can be observed when the door D of the clock case is opened. The relationship of the free tip 12 of the crank stem to the escapement anchor index 17 is then observed. If such tip and index are out of registration, the clock owner can grasp the tip 12 and move it in one direction or the other until it is in precise registration with the index 17 while pendulum 2 is held manually or by its own inertia in alignment with index 1. Such shifting of the crank stem tip will effect turning of anchor shaft 8 and anchor 10 relative to pendulum connector arm 7 by shifting such shaft relative to collar 9. Such shifting will then place the anchor 10 and the pendulum connector 7 in proper relationship so that the clock escapement will operate uniformly and the clock will tick evenly.

The alternate type of indicator and setter attachment 20 shown in FIGS. 6 to 11 can be attached to the anchor mechanism of clock works even more quickly than the type of attachment described above, and with adequate security. The attachment arm 20 can be manufactured very economically by being molded out of hard plastic material having some resilience such as polyethylene resin or nylon, instead of this attachment being cranked like that shown in FIGS. 1 to 4, inclusive. The plate 17 is mounted on the rear sideplate of the clockworks mounting between the escapement 10, 11 and the pendulum mount 5. The index 18 carried by the plate 17 is, therefore, locaed adjacent to the escapement, as shown in FIG. 7. The length of the attachment arm 20 is not critical but the index 18 should be located on plate 17 adjacent to the tip 12′ of the indicator and setter attachment arm.

The inner end or base 21 of the attachment arm has in it a notch 22 to receive the anchor shaft 8, as shown in FIG. 6. At opposite sides of the notch 8, the attachment base 21 also has in it additional notches 23 which fit over the escapement anchor 10, as shown in FIGS. 6, 7 and 11. The notches 23 are undercut so that the notched edges 24 will fit around the edges of the anchor 10 so as to secure the attachment arm to the escapement.

The attachment arm 20 can be snapped onto the anchor shaft and anchor in the manner indicated in FIGS. 10 and 11 because of the resilience of the material of which the attachment is made. One end of the notch 22 can be fitted onto the shaft 8 at one side of the anchor 10 with the arm in tilted position, as shown in FIG. 10, and the notch edges 24 at one side of the notches 23 held against one edge of the anchor 10. The arm 20 can then be rocked in the direction indicated by the arrow in FIG. 10 so that its tip 12′ moves toward the plate 17 into the position shown in FIGS. 7 and 11. During such movement from the position shown in FIG. 10 to that of FIG. 11, the opposite notch edges 24 will snap over the opposite edge of the anchor 10.

With the attachment arm in this position, the engagement of the notch edges 24 beneath the anchor 10 will hold the attachment arm securely in position perpendicular to anchor shaft 8 and anchor 10 despite the application of a force to the tip 12′ of the arm in a direction parallel to the central portion of the anchor 10. If the tip 12′ of the arm 20 is not precisely aligned with the index 18 when the tip of the pendulum 2 is in precise alignment with the pendulum index mark 1, a force can simply be applied to the attachment arm 20 to swing it until its tip 12′ is precisely aligned with the index 18. Such swinging of the index arm will swing anchor 10 and rotate anchor shaft 8 correspondingly, so as to adjust approximately the relationship between the anchor shaft and the pendulum arm 7, as described above. By this procedure the proper relationship between the anchor and the pendulum can be established to provide precisely even clock ticking.

I claim:

1. Clock escapement mechanism comprising a frame, an escape wheel, shaft means mounting said escape wheel and journaled in said frame for rotation about an axis fixed relative to said frame, anchor means including an anchor and an anchor shaft carrying said anchor and journaled in said frame for rotation about an axis stationary with respect to said frame [and fixed relative to said escape wheel axis], a pendulum connector frictionally mounted on said anchor shaft and angularly adjustable relative to said *anchor* shaft, an indicator arm projecting from and fixedly secured to said anchor shaft, and index means cooperating with said indicator arm for indicating the angular position of said pendulum connector relative to said anchor shaft.

2. The mechanism defined in claim 1, and clamping means attaching the indicating means to the anchor shaft.

3. The mechanism defined in claim 2, in which the clamping means includes a notch engageable with the anchor.

4. The mechanism defined in claim 3, in which the notch is undercut for snap connection of the indicator arm to the anchor.

5. The mechanism defined in claim 1, in which the indicator arm has a notch for receiving the anchored shaft therein and a second notch engageable with the anchor to hold the arm against swinging relative to the anchor shaft about the axis of the anchor shaft.

6. The mechansim defined in claim 4, in which the indicator arm is a cranked stem having one end portion connected to the anchor shaft and its other end portion projecting transversely of the anchor shaft and offset longitudinally of the anchor shaft from said end portion connected to the anchor shaft.

7. The mechanism defined in claim 1, in which the indicator arm has crossed notches in its base opening endwise of the arm for engagement with the anchor shaft and the anchor, respectively.

8. The mechanism defined in claim 7, in which the width of the notch opening for receiving the anchor is less than the width of the anchor.

*9. Clock escapement mechanism comprising a frame, an escape wheel, a shaft mounting said escape wheel and journaled in said frame for rotation about an axis fixed relative to said frame, anchor means including an anchor and an anchor shaft carrying said anchor and journaled in said frame for rotation about an axis stationary with respect to said frame, pendulum connector means mounted on said anchor shaft, angularly adjustable relative to said anchor shaft and held in any angularly adjusted position relative to said anchor shaft only by friction, an indicator fixedly carried by and projecting from one of said means, and an index for indicating the position of the other of said means and cooperating with said indicator to show the angular relationship between said pendulum connector means and said anchor means existing at any particular time.*

* * * * *

UNITED STATES PATENT OFFICE

CERTIFICATE OF CORRECTION

Patent No. Re. 29,290 Dated July 5, 1977

Inventor(s) Dale Nofziger

It is certified that error appears in the above-identified patent and that said Letters Patent are hereby corrected as shown below:

Title page, [56] References Cited, cancel "Fawyer" and insert --Fawver--.

Signed and Sealed this

*Thirteenth* Day of *December 1977*

[SEAL]

*Attest:*

RUTH C. MASON
*Attesting Officer*

LUTRELLE F. PARKER
*Acting Commissioner of Patents and Trademarks*